(12) United States Patent
Libman et al.

(10) Patent No.: US 8,910,799 B2
(45) Date of Patent: Dec. 16, 2014

(54) INTEGRATED MEMBRANE SYSTEM FOR DISTRIBUTED WATER TREATMENT

(75) Inventors: Vyacheslav Libman, Cupertino, CA (US); Boris Eliosov, Rugby, ND (US)

(73) Assignee: Enveera, Inc., Burlingame, CA (US)

( * ) Notice: Subject to any disclaimer, the term of this patent is extended or adjusted under 35 U.S.C. 154(b) by 397 days.

(21) Appl. No.: 13/195,746

(22) Filed: Aug. 1, 2011

(65) Prior Publication Data

US 2013/0032533 A1 Feb. 7, 2013

(51) Int. Cl.
| | |
|---|---|
| *C02F 1/44* | (2006.01) |
| *B01D 61/04* | (2006.01) |
| *B01D 61/58* | (2006.01) |
| *C02F 9/00* | (2006.01) |
| B01D 35/02 | (2006.01) |
| C02F 1/52 | (2006.01) |
| C02F 3/12 | (2006.01) |
| C02F 3/00 | (2006.01) |
| C02F 3/08 | (2006.01) |
| B01D 61/02 | (2006.01) |
| C02F 3/28 | (2006.01) |
| B01D 61/14 | (2006.01) |
| C02F 1/76 | (2006.01) |

(52) U.S. Cl.
CPC ... *C02F 9/00* (2013.01); *C02F 1/52* (2013.01); *B01D 2311/12* (2013.01); *C02F 3/1273* (2013.01); *C02F 2209/03* (2013.01); *B01D 61/58* (2013.01); *C02F 3/005* (2013.01); *C02F 2303/16* (2013.01); *C02F 2209/001* (2013.01); *C02F 1/441* (2013.01); *C02F 1/444* (2013.01); *C02F 3/08* (2013.01); *C02F 2209/42* (2013.01); *B01D 61/025* (2013.01); *C02F 3/28* (2013.01); *C02F 2209/44* (2013.01); *B01D 61/14* (2013.01); *C02F 1/76* (2013.01); *B01D 61/04* (2013.01)

USPC ...................... 210/416.1; 210/652; 210/195.2

(58) Field of Classification Search
None
See application file for complete search history.

(56) References Cited

U.S. PATENT DOCUMENTS

| | | | |
|---|---|---|---|
| 3,662,890 A | * | 5/1972 | Grimshaw ................ 210/195.1 |
| 5,151,187 A | | 9/1992 | Behmann |
| 5,501,798 A | | 3/1996 | Al-Samadi et al. |
| 5,910,250 A | | 6/1999 | Mahendran et al. |
| 6,235,196 B1 | | 5/2001 | Zhou et al. |

(Continued)

FOREIGN PATENT DOCUMENTS

| | | |
|---|---|---|
| EP | 0863793 | 10/1999 |
| EP | 1194217 | 6/2004 |

(Continued)

*Primary Examiner* — Katherine Zalasky
(74) *Attorney, Agent, or Firm* — Blakely, Sokoloff, Taylor & Zafman LLP

(57) ABSTRACT

Integrated membrane treatment systems for treatment of an aqueous solution. In embodiments, components, such as an MBR, are integrated with means to recover energy from the system, for example from an RO concentrate, to operate the other components. In embodiments including biological treatment, RO is integrated with other components, such as an MBR with the ROs ability to remove inorganic nitrogen enabling biological treatment to be performed with only partial nitrification and the MBR operated without active pH control. In embodiments, RO is integrated with a chlorine generator to convert chlorides present in the RO concentrate for an in-situ source of oxidizing biocides for disinfection purposes. Chloramines may be generated in-situ from residual ammonia and chlorides in the RO reject. In embodiments, carrier media is employed in a membrane tank to enhance removal of residual organics by the MBR and to also improve effectiveness of membrane scouring.

15 Claims, 11 Drawing Sheets

(56) References Cited

U.S. PATENT DOCUMENTS

| | | | |
|---|---|---|---|
| 6,258,278 | B1 | 7/2001 | Tonelli et al. |
| 6,451,201 | B1 | 9/2002 | Cadera et al. |
| 6,470,683 | B1* | 10/2002 | Childs et al. ............... 60/641.8 |
| 6,547,968 | B1 | 4/2003 | Rabie et al. |
| 6,592,763 | B1 | 7/2003 | Benedictus et al. |
| 6,616,843 | B1 | 9/2003 | Behmann et al. |
| 6,708,957 | B2 | 3/2004 | Cote et al. |
| 6,767,455 | B2 | 7/2004 | Goldsmith |
| 6,814,868 | B2 | 11/2004 | Phagoo et al. |
| 6,863,817 | B2 | 3/2005 | Liu et al. |
| 6,863,823 | B2 | 3/2005 | Cote |
| 7,022,236 | B2* | 4/2006 | Liu et al. ............... 210/620 |
| 7,087,173 | B2 | 8/2006 | Cote et al. |
| 7,118,672 | B2 | 10/2006 | Husain et al. |
| 7,169,295 | B2 | 1/2007 | Husain et al. |
| 7,387,723 | B2 | 6/2008 | Jordan |
| 7,563,363 | B2 | 7/2009 | Kuzma |
| 7,591,950 | B2 | 9/2009 | Zha et al. |
| 7,648,634 | B2* | 1/2010 | Probst ............... 210/620 |
| 2004/0168980 | A1 | 9/2004 | Musale et al. |
| 2006/0065597 | A1* | 3/2006 | Kunczynski ............... 210/637 |
| 2008/0017558 | A1 | 1/2008 | Pollock et al. |
| 2008/0058576 | A1* | 3/2008 | Shafer et al. ............... 588/300 |
| 2008/0105615 | A1* | 5/2008 | Noguchi ............... 210/630 |
| 2008/0283469 | A1 | 11/2008 | Pollack |
| 2008/0290032 | A1* | 11/2008 | Ton That ............... 210/651 |
| 2009/0050561 | A1 | 2/2009 | Sattler |
| 2009/0065444 | A1 | 3/2009 | Alley |
| 2010/0038310 | A1 | 2/2010 | Shafer et al. |
| 2010/0096327 | A1 | 4/2010 | Gin et al. |
| 2010/0300947 | A1 | 12/2010 | Sun |

FOREIGN PATENT DOCUMENTS

| | | |
|---|---|---|
| EP | 1452493 | 9/2004 |
| EP | 1527810 | 5/2005 |
| EP | 1645327 | 4/2006 |
| EP | 2226115 | 9/2010 |
| WO | WO-9411094 | 5/1994 |
| WO | WO-9517241 | 6/1995 |
| WO | WO-9929401 | 6/1999 |
| WO | WO-0108789 | 2/2001 |
| WO | WO-03002468 | 1/2003 |
| WO | WO-2005082498 | 9/2005 |
| WO | WO-2005100264 | 10/2005 |
| WO | WO-2006002529 | 1/2006 |
| WO | WO-2007006153 | 1/2007 |

* cited by examiner

INTEGRATED MEMBRANE SYSTEM FOR DISTRIBUTED WATER TREATMENT

TECHNICAL FIELD

Embodiments of the invention relate to water and wastewater treatment and more particularly to integrated membrane treatment systems.

BACKGROUND

There are many technologies for water/wastewater treatment with practically no limit to water quality achievable when treating a majority of the existing water/wastewater streams. Biological treatment is the most widely used technology. It utilizes metabolism of microorganisms to remove organic matter, as well as other dissolved nutrients including nitrogen and phosphorus. Biological mass (biomass) is also known to adsorb heavy metals, suspended solids, and other sorts of contaminants which do not undergo biological degradation. Biomass is separated from the treated liquid, thus allowing for discharge of treated water (effluent) and disposal of the excess of the biomass (sludge). Depending on the quality of the water for treatment (influent), two biological treatment methods are typically used separately or in combination. A first is anaerobic treatment, which does not require aeration (addition of dissolved oxygen). The other is aerobic treatment, utilizing dissolved oxygen in the biological treatment.

For concentrated wastewater streams, anaerobic treatment is commonly used to achieve partial degradation of the contamination. Although aerobic treatment consumes more energy than anaerobic treatment, aerobic treatment is often used to achieve a more rapid and complete removal of the organic pollutants. The activated sludge method is an example of an aerobic biological treatment for municipal wastewater containing a relatively low level of organic impurities using biomass mixed with the treated liquid.

Recent development in wastewater treatment technology have demonstrated integration of a filtration membrane (micro or ultra) with activated sludge or anaerobic treatment provides effective method of sludge separation and process control, achieving more efficient treatment. Such a combination is called a Membrane Bioreactor (MBR). However, the effluent produced by biological treatment and microfiltration is insufficient for significant number of uses as the effluent contains bacteria, viruses, and residual amounts of organic and inorganic contaminants. Therefore additional treatment, such as chemical disinfection, UV disinfection, ion exchange, sorption, etc. is common. Because of limitations in treatment efficiency, these technologies are often used in combination, resulting in high treatment cost.

Reverse Osmosis (RO) technology is another commonly used process which provides high treatment efficiency. RO membranes effectively remove suspended solids (including viruses and bacteria), often with higher efficiency and reliability than MBR. RO membranes also remove inorganic matter (including dissolved salts, thus providing softening effect). RO can also remove high molecular weight dissolved organics, which is typically a main fraction of the biological treatment effluent.

However, conventional implementations of both MBR and RO technologies have significant drawbacks resulting in high treatment cost. For example, MBR requires a long retention time to ensure efficient nitrogen removal. This long retention time translates into large footprint and higher capital cost. Also, conventional MBR implementations require a large number of units of mechanical equipment, including hydraulic pumps, blowers, compressors, vacuum pumps, etc. This again increases capital cost and maintenance cost, and raises reliability concerns.

Deficiencies in conventional RO implementations include high-energy consumption and high pretreatment cost. Another problem with treating MBR effluent by RO is bio-fouling of RO membranes. Controlling bio-fouling by disinfection is difficult due to the fact that oxidizing biocides may attack the membrane material and adversely affect membrane performance. Disinfection also typically entails a use of chemicals which require special permits and adds operational complexity In view of recent trends in environmental/health regulations, as well as greater public awareness of the importance of clean water, decentralized small-scale treatment technologies are expected to become more important. Generally, when scaling the typical applications down, the cost of each volumetric unit of the treated water increases exponentially. More particularly, the operational difficulties, permitting, and concomitant costs described above have thus far limited application of these treatment technologies to large treatment plants of a size of the POTW (publicly owned treatment works). Furthermore, systems designed to overcome the constraints typical of smaller scale systems may also prove to be cost competitive for implementations at the POTW scale.

SUMMARY OF DESCRIPTION

Embodiments of the present invention integrated membrane systems which when operated independently are comparatively less efficient. The integrated systems enable efficient operation across a wide range of volumetric flows for scalability that is well-suited to a distributed treatment model. In certain embodiments, the integrated treatment systems described herein are implemented for distributed treatment within a framework of an existing sewerage system.

In embodiments, RO is integrated with other components of a water treatment system, such as a biological unit, or an MBR, to recover energy from the RO unit, for example from the RO concentrate (reject), to operate the other components. In one such embodiment, a single hydraulic pump is harnessed to operate the majority of the treatment system. As such, synergy between the RO and other components of the system simplify operation and maintenance of the water treatment system.

In embodiments, RO is integrated with other components of a water treatment system, such as a biological unit, or an MBR, to leverage the RO's ability to remove inorganic nitrogen. In certain such embodiments, removal of nitrogen by RO enables biological treatment to be performed incompletely, thereby advantageously reducing retention times. In further embodiments, reliance on the RO for nitrogen removal enables biological treatment to be performed with only partial nitrification (oxidation of ammonia to nitrate) further enabling the biological treatment to be performed with no pH control. In embodiments with no pH control, pH freely varies as a function of the wastewater influent quality and level of biological activity sustainable with no active pH control. As such, ammonia may exist in the treated water with the pH most likely dropping below 7. With no active pH control, chemical use and handling is reduced. As such, synergy between the RO and other components of the system simplify operation and maintenance of the water treatment system.

In embodiments, RO is integrated with a chlorine generator to convert chlorides present in the RO concentrate for an in-situ source of oxidizing biocides for disinfection purposes.

In certain such embodiments, where biological treatment is performed incompletely, residual inorganic nitrogen in the RO concentrate (present because of the partial nitrification) is further utilized, along with the chlorides to derive chloramines for disinfection purposes. In further embodiments, the pressurized RO concentrate is utilized to drive service flows employing the disinfectant so that a separate metering system is not required. As such, a synergy between the RO and other components of the system reduces system complexity, chemical use, and improves membrane lifetimes.

In embodiments, carrier media is employed in a membrane tank to improve effectiveness of membrane scouring through mechanical agitation by the carrier media and potentially enhance removal of residual organics by the MBR.

BRIEF DESCRIPTION OF THE DRAWINGS

Embodiments of the present invention are illustrated by way of example, and not limitation, in the figures of the accompanying drawings in which.

DETAILED DESCRIPTION

Described herein are integrated membrane water treatment systems and water treatment methods which may be performed by such systems. In the following description, numerous specific details are set forth, such as exemplary treatment and filtration apparatuses to describe embodiments of the present invention. However, it will be apparent to one skilled in the art that embodiments of the present invention may be practiced without such specific details. In other instances, well-known aspects, such as specific biological treatment techniques, solids separation techniques, etc. and associated hardware, are not described in detail to avoid unnecessarily obscuring embodiments of the present invention.

Reference throughout this specification to "an embodiment" means that a particular system component or operative sequence described in connection with the embodiment is included in at least one embodiment of the invention. Thus, use of the phrase "in an embodiment" in various places throughout this specification are not necessarily referring to the same embodiment of the invention. Furthermore, exemplary system components or operative sequences may be combined in any suitable manner in one or more embodiments. Also, it is to be understood that the various exemplary embodiments shown in the Figures are merely illustrative representations, are not to scale, and are not exclusive of additional hardware and/or operations which remain otherwise consistent with system operation. In the figures, reference numbers are retained where convenient for the sake of avoiding duplicative description of components shared between embodiments.

The terms "coupled" and "in fluid communication," are used herein to describe structural and functional relationships between components, respectively. Two components "coupled" together are in either direct or indirect (with other intervening components between them) physical contact with each other. Two components "in fluid communication" are coupled in a manner such that a fluid from one component is capable of flowing to the other component.

Generally, the systems described herein are for the removal of any contaminant from any aqueous solution. Therefore, the term "water treatment" is employed herein in its broadest sense to mean removal of a contaminant, be it by solids separation, chemical, physical, biological treatment, etc. Similarly, any reference to "wastewater" is to be understood as a label for any aqueous solution having an impurity level which is to be improved, be it domestic sewage effluent, industrial effluent, or non-point source runoff, etc. Exemplary embodiments describing the treatment of any specific classes or types of wastewater are therefore merely to emphasize the broad applicability of the present invention.

Figure 1:
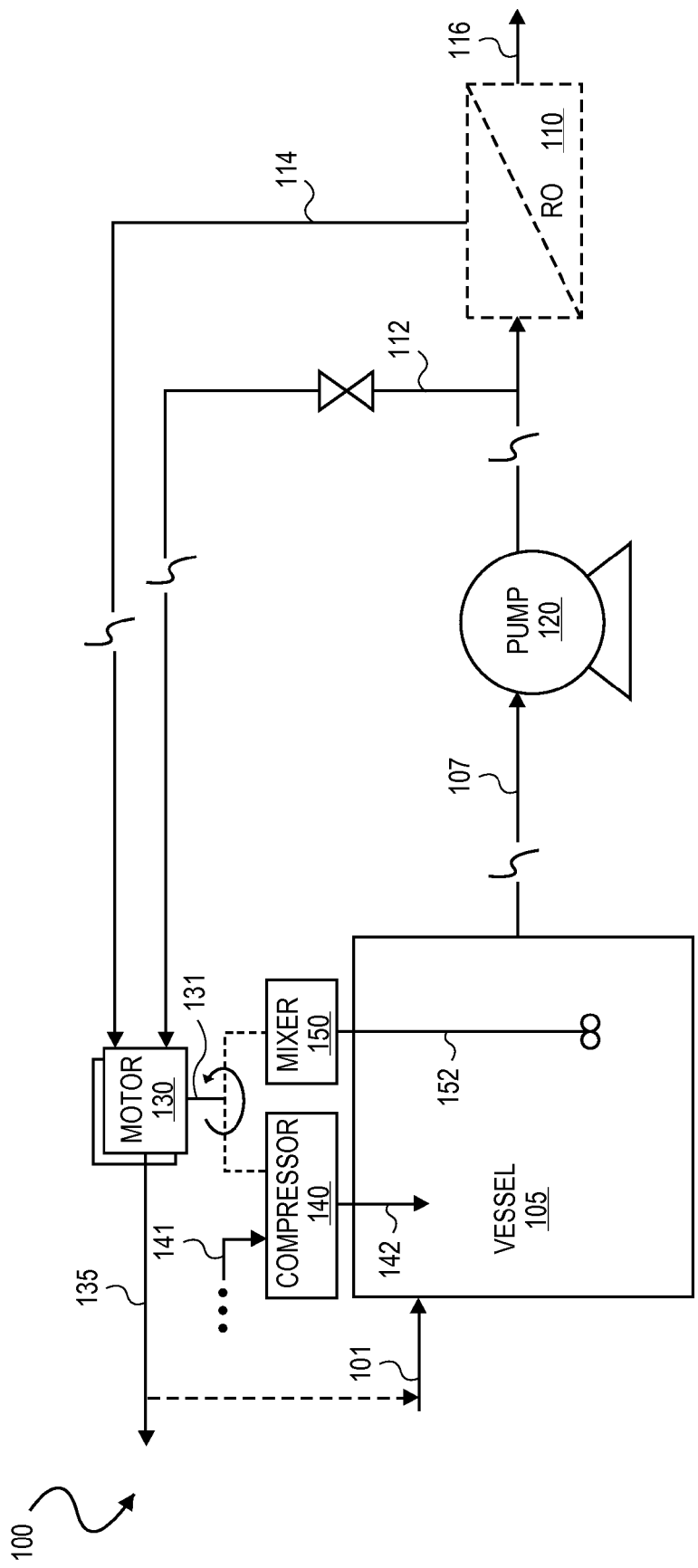
FIG. 1 illustrates a flow path diagram for water treatment system with an energy recovery system for integrated treatment and/or filtration of an aqueous solution, in accordance with an embodiment of the present invention.
Figure 2:
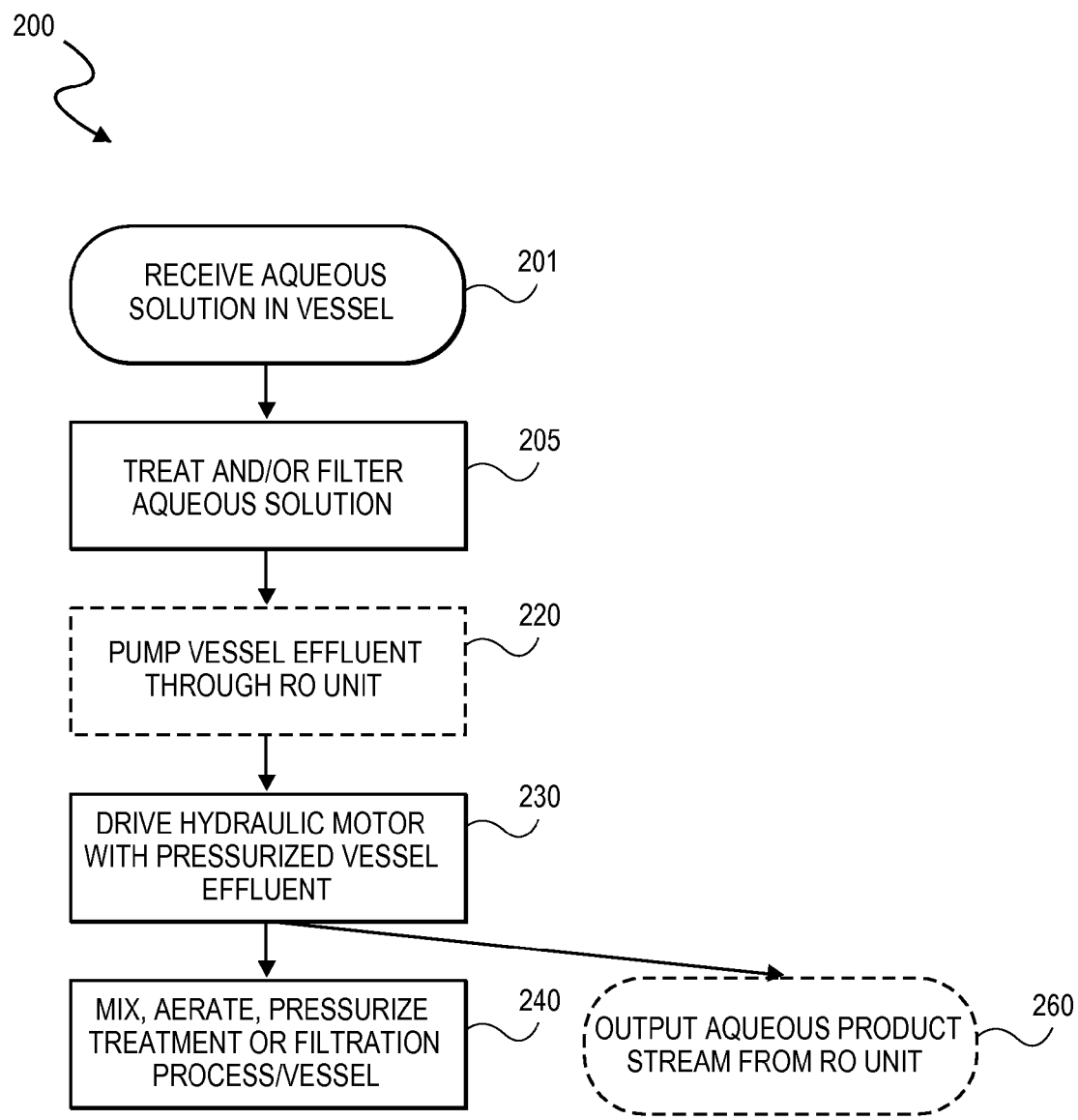
FIG. 2 illustrates a water treatment method which may be performed by water treatment system illustrated in FIG. 1 to employ RO and recover energy there from for integrated treatment and/or filtration of an aqueous solution, in accordance with an embodiment of the present invention.

FIG. 1 illustrates a flow path diagram for a water treatment system 100 with an energy recovery system for integrated treatment and/or filtration of an aqueous solution, in accordance with an embodiment of the present invention. FIG. 1 is described in the context of FIG. 2, illustrating operations of an exemplary water treatment method 200 that may be performed by the water treatment system 100.

Beginning at operation 201, an aqueous solution having impurities of any type (i.e., "wastewater") is received as the influent stream 101 (FIG. 1) to a vessel 105. In certain embodiments, the wastewater is preferably with a brackish salinity level to provide a source of salts which are employed as an in-situ source of biocides, as described further herein.

At operation 205 (FIG. 2), at least one of filtration, aerobic or anaerobic biological treatment, chemical treatment (e.g., oxidation of Mn and Fe, etc. or chemical precipitation such as HF waste with $CaCl_2$, etc.), or physical-chemical treatment (e.g., coagulation or flocculation) of the aqueous solution is performed within the vessel 105. The term "filtration" is employed here, as well as throughout the remainder description, to refer to either microfiltration or ultrafiltration, as the present invention is not limited in that respect.

In an embodiment, processed effluent from the vessel 105 is utilized to drive one or more activities occurring in the vessel 105. In the exemplary implementation, the processed effluent is driven downstream by a hydraulic pump 120 disposed downstream from the vessel 105. Energy may be recovered from the hydraulic pump 120 utilized to drive one or more activities performed in the vessel 105. In the depicted embodiment, the processed effluent is supplied into an influent side of an RO unit 110. The RO unit is drawn in dashed line to emphasize, that the energy recovery illustrated in FIG. 1 is not dependent on RO being performed downstream, though additional synergies are to be had for those embodiments employing an RO unit, as described elsewhere herein.

For embodiments herein employing RO, the RO unit 110 may be of any design known in the art with many variants being commercially available to filter via a diffusive mechanism with separation efficiency being dependent on solute concentration, pressure, and flux rate rather than size exclusion as for membrane filtration. Effluent from the RO includes a permeate stream 116 and concentrate (reject) stream 114. The permeate stream 116, as the product of the water treatment system 100 is provided to a downstream application, be it further purification or consumption. Although the hydraulic pump 120 is in fluid communication with both the vessel 105 and the RO unit 110, the breaks in the effluent stream 107 denote one or more intervening process vessels, process controls, etc. may be disposed there between.

As illustrated in FIG. 1, a motor 130 is driven with the pressurized vessel effluent at operation 230. The hydraulically driven motor 130 may be of any design known in the art, with an exemplary system being the HydroDrive, commercially available from Hastec HydroDrives, Inc. of St. Catharines, Ontario, Canada. Depending on the embodiment, and as illustrated in FIG. 1, the drive side of the motor 130 is in fluid communication with either or both the RO concentrate stream 114 or an RO bypass stream 112 disposed downstream of the hydraulic pump 120 and upstream of the RO unit 110, each of which provides a pressurized source with an associated pressure head and volumetric flow rate.

For embodiments where no RO is employed, at least some portion of effluent from the pump 120 is utilized to drive one or more motor 130 as coupled to either or both the compressor 140 (to provide aeration and/or pressurization gas stream 142) and mixer 150. Depending on the stream employed to drive the motor 130, the motor effluent stream 135 may be either reintroduced into the system upstream of the hydraulic pump 120 (e.g., returned vessel effluent stream 107 where RO bypass stream 112 drives the motor 130) or discharged to a waste drain (e.g., where the RO concentrate stream 114 drives the motor 130). For embodiments in which the drive side of the motor 130 is in fluid communication with the RO concentrate stream 114, the motor 130 provides a means of recovery residual energy remaining downstream of the RO unit. For embodiments in which the drive side of the motor 130 is in fluid communication with the RO bypass stream 112, the motor 130 provides a means to enable the hydraulic pump 120 to be a single energy source for the treatment system 100. The hydraulic pump 120 is therefore to be sized to accommodate the additional load associated with driving the motor 130.

With the motor 130 having a drive side in fluid communication with the hydraulic pump 120, a driven side of the motor 130 is harnessed at operation 240 (FIG. 2) to power one or more action performed in the vessel 105. Although any processing action conventional in the art may be powered by the motor 130, exemplary embodiments include one or more of mixing, aerating, or pressurizing a filtration or biological, chemical, or physical-chemical treatment with at least some portion of effluent from the vessel 105. In one embodiment, the driven side of the motor 130 coupled to a compressor 140 having an inlet coupled to a gas source, such as ambient air, and an outlet coupled into the vessel 105 to pressurize the vessel (e.g., in the case of a filtration process occurring in the vessel 105, as described further elsewhere herein) or aerate processes performed in the vessel with the gas (e.g., air) introduced. Typically, for such an application, the drive side of the motor 130 is to be in fluid communication with the RO bypass stream 112 for a larger pressure head and volumetric flow rate.

In another embodiment, the motor 130 has the driven side coupled to a mechanical mixer 150 disposed within the vessel 105. For one such an embodiment, the vessel 105 may be operated as a CSTR with the mixer shaft 152 driven by the motor 130. Depending on the load, the drive side of the motor 130 may be in fluid communication with either concentrate outlet of the RO unit 110 (to be driven by the concentrate stream 114) or in fluid communication with the RO bypass stream 112. In further embodiments, multiple motors 130 may be driven by the pressurized vessel effluent. For example, and as further described elsewhere herein, a first motor 130 drives the mixer 150 with the RO concentrate stream 114 while a second motor 130 drives the compressor 140 with the RO bypass stream 112.

Figure 3A:
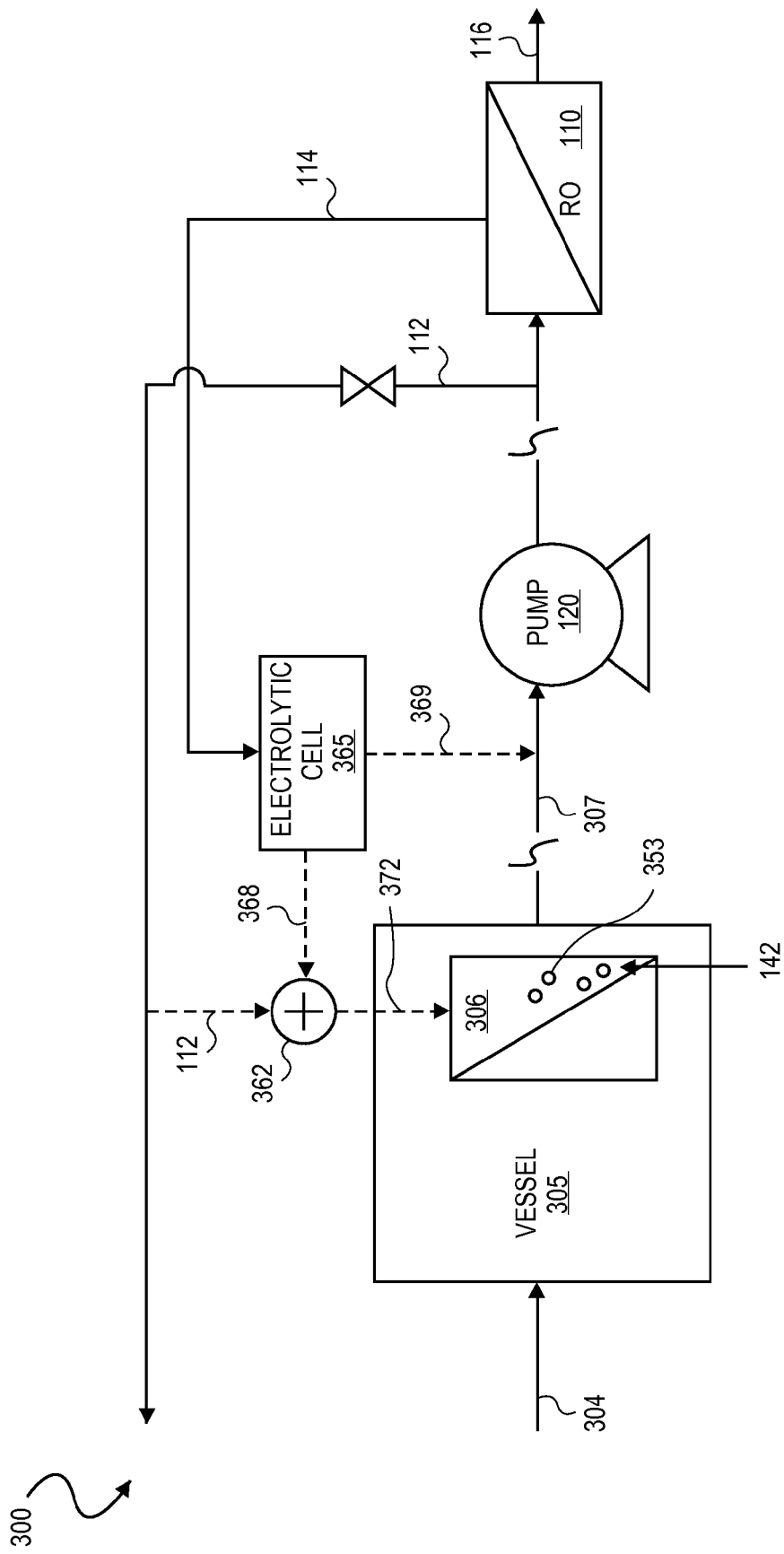
FIG. 3A illustrates a flow path diagram for a water treatment system with an RO salt electrolysis system for integrated disinfection of the system and aqueous solution treated by the system, in accordance with an embodiment of the present invention.
Figure 4:
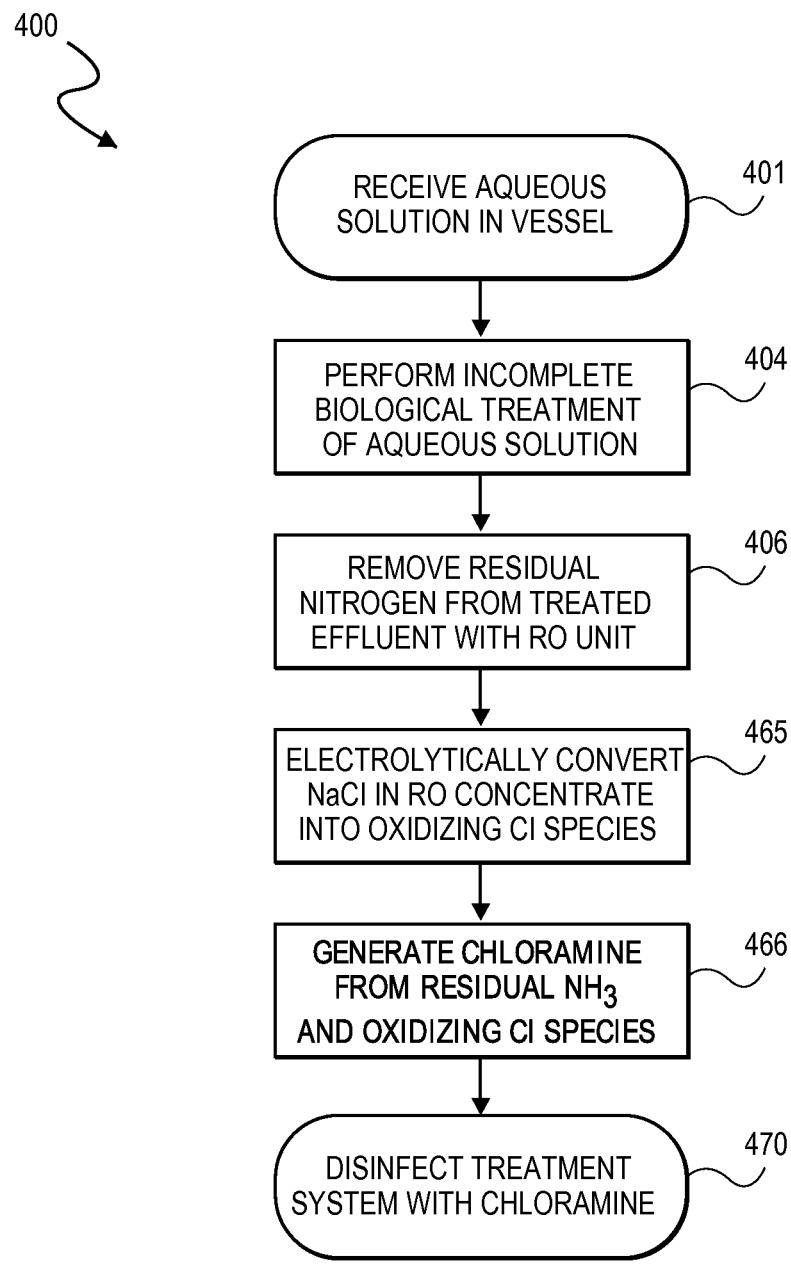
FIG. 4 illustrates a water treatment method which may be performed by water treatment system illustrated in FIG. 3A to convert salts recovered from an RO concentrate into oxidizing biocides for integrated disinfection of the system and the aqueous solution treated by the system, in accordance with an embodiment of the present invention.

FIG. 3A illustrates a flow path diagram for a water treatment system 300 with an RO salt electrolysis system for integrated disinfection of the system and of the aqueous solution treated by the system, in accordance with an embodiment of the present invention. FIG. 3A is described in the context of FIG. 4 illustrating an exemplary operation of a water treatment method 400 that may be performed by the water treatment system 300.

Beginning at operation 401, an aqueous solution having biodegradable impurities is received as the influent stream 304 (FIG. 3A) to a filtration vessel 305. For the exemplary embodiment illustrated in FIG. 3A, a porous membrane filter 306 is submerged within the filtration vessel 305 with an effluent side of the filter 306 passing through a wall of the filtration vessel 305 for solid separation in addition to biological treatment, for example in the case of an MBR.

In the exemplary embodiment, biological treatment at operation 404 is performed incompletely, such that nitrogen (e.g., ammonia) is not completely removed. For example, operation 404 may have a corresponding solids retention time of between 1 and 15 days whereas in conventional systems designed for complete nitrogen removal retention time is typically 20 to 40 days. In further embodiments, operation 404 is performed without pH control. As such, operation 404, and indeed all the operations in the entire treatment system 300, is operated at whatever steady-state pH naturally occurs (e.g., as a function of the biological treatment process performed at operation 404). With nitrification occurring to some extent, steady-state pH is lowered, for example to be below 7. A lower pH inhibits biological processes as well as further nitrification. Allowing pH to drop freely to a relatively low level has the advantage of avoiding caustic addition, reduced oxygen demand and therefore a lower energy consumption for aeration, and reduced bio-fouling of the membrane filter 306.

Effluent from the filtration vessel 305 is driven into an influent side of the RO unit 110 by the hydraulic pump 120 disposed downstream from the filtration vessel 305. Inorganic nitrogen (ammonia, ammonium salt, etc.) remaining after the treatment operation 404 is removed by the RO at operation 406. RO permeate stream 116, as the product of the water treatment system 300 is provided to a downstream application, be it further purification or consumption. For those embodiments where pH is allowed to drop freely (e.g., upon partial nitrification), scaling of the RO membrane will be advantageously reduced. Although the hydraulic pump 120 is in fluid communication with both the filtration vessel 305 and the RO unit 110, the breaks in the effluent stream 307 denote one or more intervening process vessels, process controls, etc. may be disposed there between.

In an embodiment of the present invention a chlorine generator is integrated with the RO unit 110 for in-situ generation of biocides for disinfection. As further illustrated in FIG. 3A, an electrolytic cell 365 is in fluid communication with the concentrate outlet of the RO unit 110. The electrolytic cell 365 is to decompose by electrolysis at least some of the salts present in the RO concentrate into more reactive species which are either oxidizing biocides or can be further reacted into oxidizing biocides. The electrolytic cell 365 may be any known in the art designed for electrolysis of aqueous salt solutions, such as those commercially available for brine/seawater processing. Exemplary systems are available under the trade name SEACLOR® from Severn Trent De Nora located in Sugarland, Tex. While such systems are typically designed to generate biocides from a seawater influent or high concentration sodium chloride solution, for embodiments of the present invention the electrolytic cell 365 is integrated into the water treatment system 300 for in-situ derivation of oxidizing species from the RO concentrate stream 114 which is high in salts separated from the vessel effluent stream 307. Chlorides concentration in the RO reject will be typically 4-5 times as high as that of the vessel effluent stream 307, but 1-2 orders of magnitude lower concentration than sea water.

In the exemplary method illustrated in FIG. 4, chloride salts (e.g., NaCl) in the RO concentrate stream 114 are decomposed at operation 465 to produce a reactive chlorine-containing species, such as, but not limited to one or more of chlorine ($Cl_2$), hypochlorite ($ClO^-$), chlorine dioxide ($ClO_2$), and chloride ions ($Cl^-$) with byproducts including aqueous sodium hydroxide (NaOH). Depending on the other constituents in the RO concentrate stream 114, the reactive chlorine-containing species may be further reacted with one or more constituents in the RO concentrate stream 114. As further illustrated in FIG. 4, at operation 466, nitrogen sources (e.g. ammonia ($NH_3$)) in RO concentrate stream 114 react with the reactive chlorine-containing species form chloramines, such as, but not limited to, monochloramine $ClNH_2$.

At operation 470, the treatment system 300, as well as the filtered effluent stream 307 itself in certain embodiments (e.g., in generation of drinking water), is disinfected by the oxidizing biocides derived from the RO and electrolysis processes. Operation 470 may be performed continuously during operation of the treatment system 300 or intermittently as a service flow method. As further illustrated in FIG. 3A, the electrolytic cell 365 is coupled to at least one of the filtration vessel 305 and RO unit 110. In one embodiment, a backwash apparatus 362 is coupled to both the electrolytic cell effluent stream 368 and the RO bypass stream 112. The backwash apparatus 362 intermittently provides a liquid back-pulse 372 from an effluent side to an influent side of the membrane filter 306 to clean the membrane pores (e.g., when MBR permeation is not pressurized). The backwash apparatus 362 may be of any design in the art with many variants being commercially available for this purpose. Because the liquid back-pulse contains the oxidizing species (biocides), the membrane filter 306 is also disinfected by the liquid back-pulse with the biocide concentration determined by mixture of the electrolytic cell effluent stream 368 and the RO bypass stream 112, both of which are pressurized by the hydraulic pump 120. Similarly, the filtration vessel 305 may also be disinfected by a periodic supply of oxidizing species provided by the backwash apparatus 362. In the preferred embodiment, with the liquid back-pulse being pressurized by the hydraulic pump 120, overall system design is simplified and capital costs reduced since a separate, dedicated metering system is not required.

In another embodiment, the electrolytic cell 365 has an outlet coupled downstream of the filtration vessel 305 for conduction of the oxidizing species (biocide) to an inlet or outlet (not depicted) of the RO unit 110, as driven by the pressure of the RO concentrate stream 514. In the illustrative embodiment, an electrolytic cell effluent stream 369 is introduced into the filtered effluent stream 307 upstream of the hydraulic pump 120 (low pressure side) for injection into the RO unit 110. RO membranes are therefore also disinfected at the operation 470 (FIG. 4), either continuously or by periodic feed from the electrolytic cell 365. For embodiments where chloramines are generated by the system 300, negative effects of chlorination to the RO membrane(s) in the RO unit 110 may be reduced.

Figure 5:
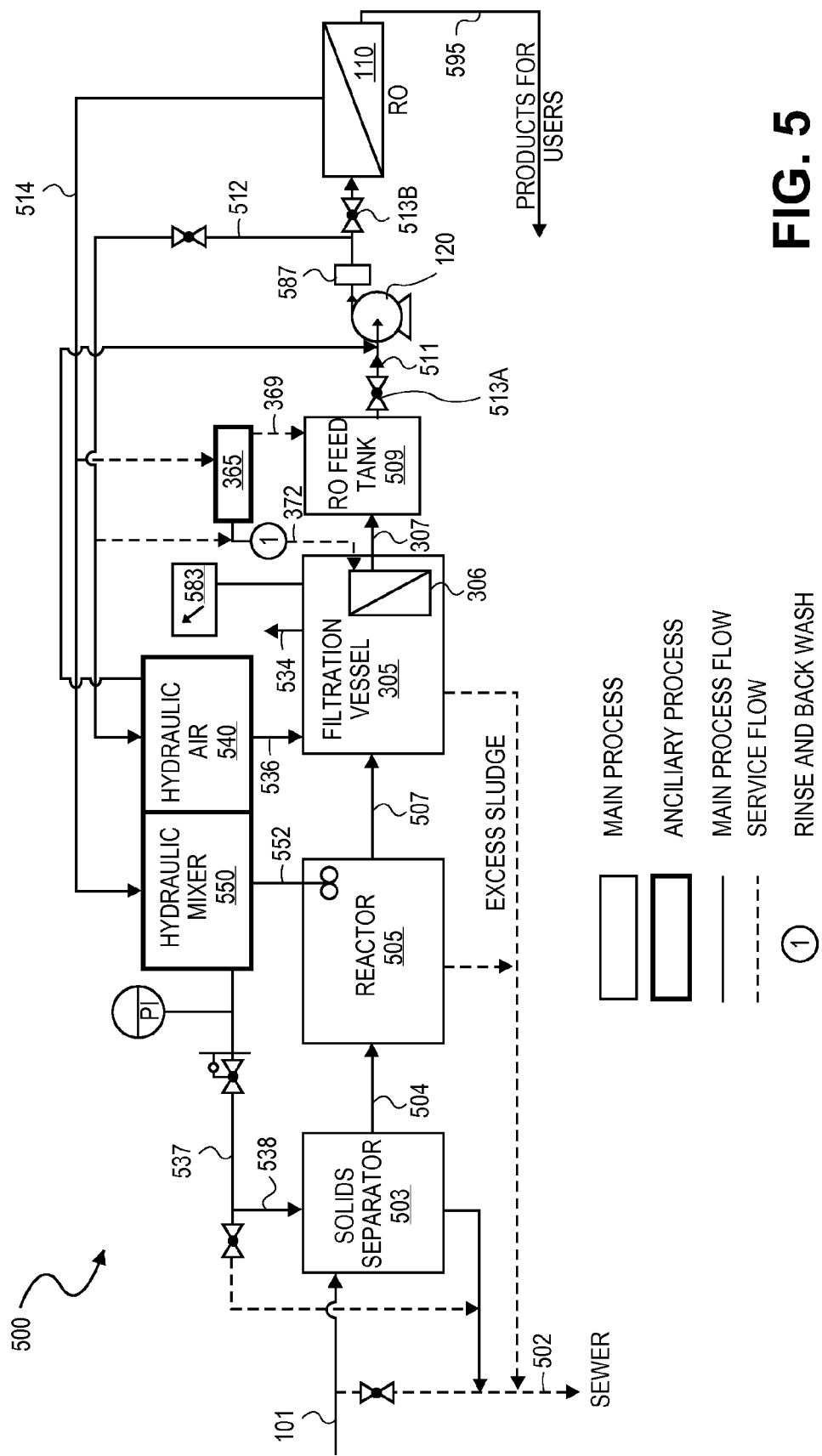
FIG. 5 illustrates a flow path diagram for a water treatment system integrating treatment, membrane filtration, and RO with energy recovery and disinfection systems, in accordance with an embodiment of the present invention.
Figure 6:
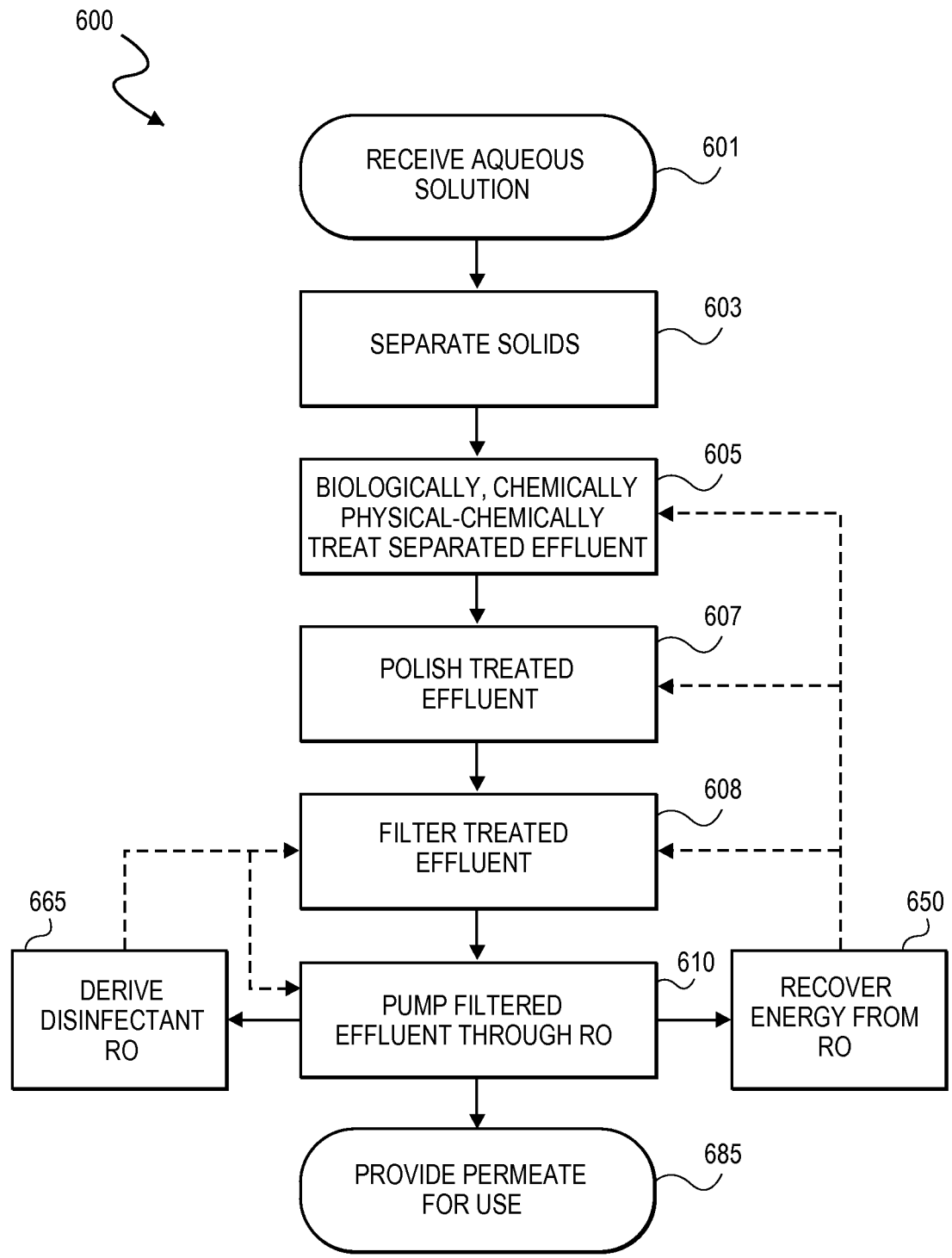
FIG. 6 illustrates a water treatment method which may be performed by water treatment system illustrated in FIG. 5 to integrate treatment, membrane filtration, and RO with energy recovery and disinfection, in accordance with an embodiment of the present invention.

In further embodiments, the components illustrated in the treatment systems 100 and 300 are combined into a single treatment system to leverage operational synergies between the respective components. FIG. 5 illustrates a flow path diagram for a water treatment system 500 integrating treatment, membrane filtration, and RO with energy recovery and disinfection systems, in accordance with an embodiment of the present invention. FIG. 5 is described in the context of FIG. 6, illustrating operations of an exemplary water treatment method 600 that may be performed by the water treatment system 500.

Beginning at operation 601, an aqueous solution having impurities of any type (i.e., "wastewater") is received as the influent stream 101 (FIG. 5) to a solids separator 503 for pretreatment. In the exemplary embodiment of municipal wastewater treatment, upstream of the solids separator 503 is a diversion valve, allowing discharge of any non-treated wastewater into a municipal sewer 502, for example when the treatment system 500 is taken out of service or when influent exceeds capacity of the system. This guarantees full reliability of the installation.

In the exemplary embodiment, the aqueous solution continuously flows by gravity into the solids separator 503. At operation 603, the solids separator 503 removes course particulates and/or grease etc. that may otherwise interfere with subsequent treatment processes. Any solids separator known in the art to have this functionality may be employed as the present invention is not limited in this context. The solids separator 503 is equipped with a drain connected to the municipal sewer 502 (or a retention vessel, etc.) to prevent excessive solids and grease accumulation.

Separator effluent stream 504 overflows to the reactor 505. At operation 605 (FIG. 2), at least one of biological, chemical (e.g., oxidation or chemical precipitation, etc.), or physical-chemical (e.g., flocculation) treatment of the aqueous solution is performed within the reactor 605 as the main treatment operation, depending on the quality of the separator effluent stream 504, process requirements, etc. For embodiments where the separator effluent stream 504 has a high organics content the reactor 505 may operate as energy efficient anaerobic digester. For embodiments where the separator effluent stream 504 has low organics content with high solids content, the reactor 505 may operate as flocculation tank. For the illustrative embodiment of municipal wastewater treatment, the reactor 505 is a first vessel of an MBR where organics are biologically decomposed and ammonia partially oxidized. In one MBR embodiment, carrier media are disposed in the reactor 505 for support of attached biomass to prevent biomass from being washed-out. Sufficient biomass concentration may therefore be maintained without recycling during operation even if solids are drained from reactor 505 to municipal sewer 502. Any carrier media known art for moving bed bioreactors (MBBR) may be utilized as the embodiments of the present invention are not limited in this respect.

Treated effluent 507 flows into the filtration vessel 305 which includes the membrane filter 306. At operation 607, the treated effluent 507 is polished in the filtration vessel 305. For a municipal wastewater treatment embodiment for example, aerobic biologic treatment is performed in the filtration vessel 305. As previously described in the context of the system 300, biological treatment performed in the reactor 505 and/or the filtration vessel 305 may be without any pH control and with the biological treatment leaving residual nitrogen in the treated effluent 507. The membrane filter 306 is submerged within the filtration vessel 305 with an effluent side of the filter 306 passing through a wall of the filtration vessel 305 to filter the treated effluent at operation 608.

In advantageous embodiments, scouring elements 353 are also disposed within the filtration vessel 305. The scouring elements 353 are displaceable within the filtration vessel 305, for example by gas introduced into the filtration vessel 305. Displacement of the scouring elements 353 is to mechanically scour an influent side of the membrane filter 306. Additionally, any suspended biomass present in the filtration vessel 305 may also utilize the scouring elements as a support media to further enhance biological treatment and improve biomass retention.

In embodiments, the scouring elements 353 are inert particles freely suspendable within the filtration vessel 305 and may be, for example, plastic beads, silica slurry, or the like. The scouring elements 353 are to be too large to pass through the membrane filter 306 and indeed may be many orders of magnitude larger and sufficiently large and of a shape to avoid becoming packed into a cake by flux across the membrane filter 306 and to avoid damaging the membrane file 306 through abrasion. In the exemplary embodiment, aeration of the vessel 305 is performed in proximity to the influent side of the membrane filter, for example in any manner known in the art capable of air scouring the membrane filter 306 and this aeration provides motive force to the scouring elements 353. Contact induced by the displacement of the scouring particles provides the mechanical scouring of the membrane filter 306.

Figure 3B:
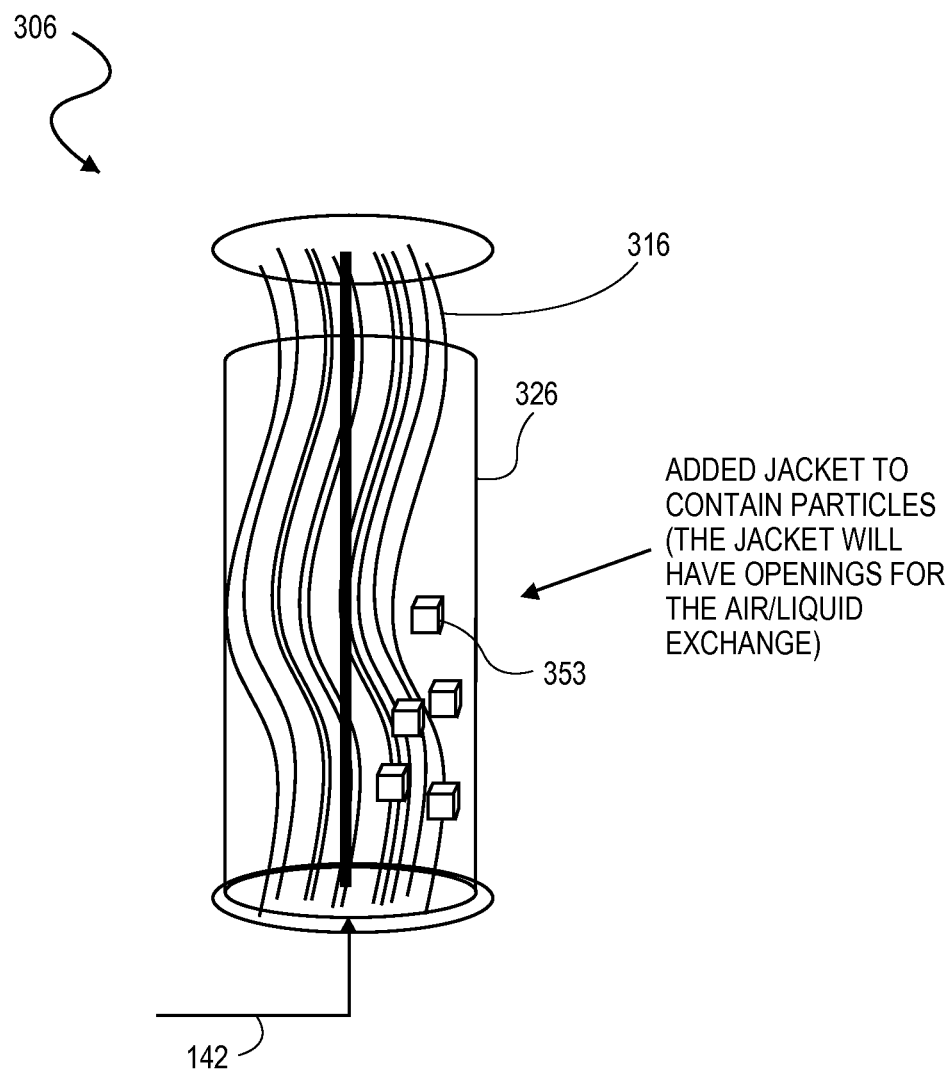
FIG. 3B illustrates an isometric view of a membrane filter, scouring elements, and scouring element retainer, in accordance with an embodiment of the present invention.

In advantageous embodiments employing the scouring elements 353, the membrane filter 306 is surrounded by a retainer which is to retain the scouring elements 353 in proximity to the influent side of the filter 306 and thereby improve their scouring efficiency. Absent such a retainer limiting the displacement of the scouring elements to within a confined subregion of the filtration vessel 305, the scouring elements 353 may tend to collect in locales away from the membrane filter 306 (e.g., in the relatively stagnant regions of the filtration vessel 305). FIG. 3B depicts an expanded isometric view of the membrane filter 306 with a scouring element retainer 326. As shown, a conventional columnar membrane filter 306 includes fibers 316 which are exposed to the bulk liquid (e.g., in the filtration vessel 305). Surrounding the columnar filter is the cylindrically-shaped scouring element retainer 326. The retainer 326 has a diameter larger than that of the membrane filter 306 to provide an annular region surrounding the membrane filter 306 inside of which the scouring elements 353 are to be retained. The retainer 326 may be of any material (e.g., PTFE, ceramic, stainless steel, etc.) and any structure (e.g., meshed, gridded, windowed, etc.) which allows for air/liquid exchange while still serving to confine the scouring elements 353. The souring elements 353 are to be disposed loosely within the annular space between the membrane fibers 316 and the retainer 326 so as to be movable by an external motive force, such as the aeration and/or pressurization gas stream 142.

The filtered effluent stream 307 is collected in an RO feed tank 509, providing volume equalization and a pressure head for the hydraulic pump 120 to drive the filtered effluent stream 511 through the RO unit 110 (and one or more scale abatement systems 587 disposed there between). The RO feed tank 509 may also serve to separate gas bubbles from the MBR, reducing cavitation at the hydraulic pump 120. Again, in the preferred embodiment the treatment system 500 relies on the single hydraulic pump 120 for operation.

With the permeate stream 595 provided for use at operation 685, integration of the RO unit 110 is such that energy is recovered from the RO unit 110 at operation 650 substantially as was described for FIGS. 1 and 2 and is applied to affect processing in any or all of the operations 605, 607 and 608, as denoted by the dashed lines in FIG. 6. Disinfectant derived in-situ from operation of the RO unit 110 is also applied, substantially as described in the context of FIGS. 3 and 4, to affect processing in any or all of the operations 608 and 610, as denoted by the dashed lines in FIG. 6. For example, as shown in FIG. 5, the electrolytic cell 365 has an effluent stream 369 coupled the RO feed tank 509 such that generated biocides (e.g., chloramines where the concentrate stream 514 includes residual inorganic nitrogen) are provided downstream of the filtration vessel 305 and upstream of the hydraulic pump 120 to introduce the biocides to an influent side of the RO unit without a separate metering system.

As illustrated in FIG. 5, pressurized RO permeate stream 514 drives a hydraulic mixer 550 (which is drawn to represent both the motor 130 and mixer 150), as previously described for the mixer 150 in system 100. Mixer effluent stream 537 may then be reintroduced as a stream 538 to the solids separator 503 or discharged to the municipal sewer 502. An RO bypass stream 512 drives a hydraulic air compressor 540 substantially as previously described for the compressor 140 in system 100 with the hydraulic air compressor 540 aerating the aerobic biological process performed in the (MBR) filtration vessel 305 via air inlet 536.

Though not depicted in FIG. 5, air may also be similarly introduced into the reactor 505. The air introduced by the hydraulic air compressor 540 also displaces any scouring elements disposed in the filtration vessel 305 to mechanically scour the influent side of the filter 306. In a preferred embodiment, the filtration vessel 305 may also be intermittently pressurized above ambient conditions by the air introduced from the hydraulic air compressor 540 to drive the treated effluent 507 through the membrane filter 306.

Figure 7A:
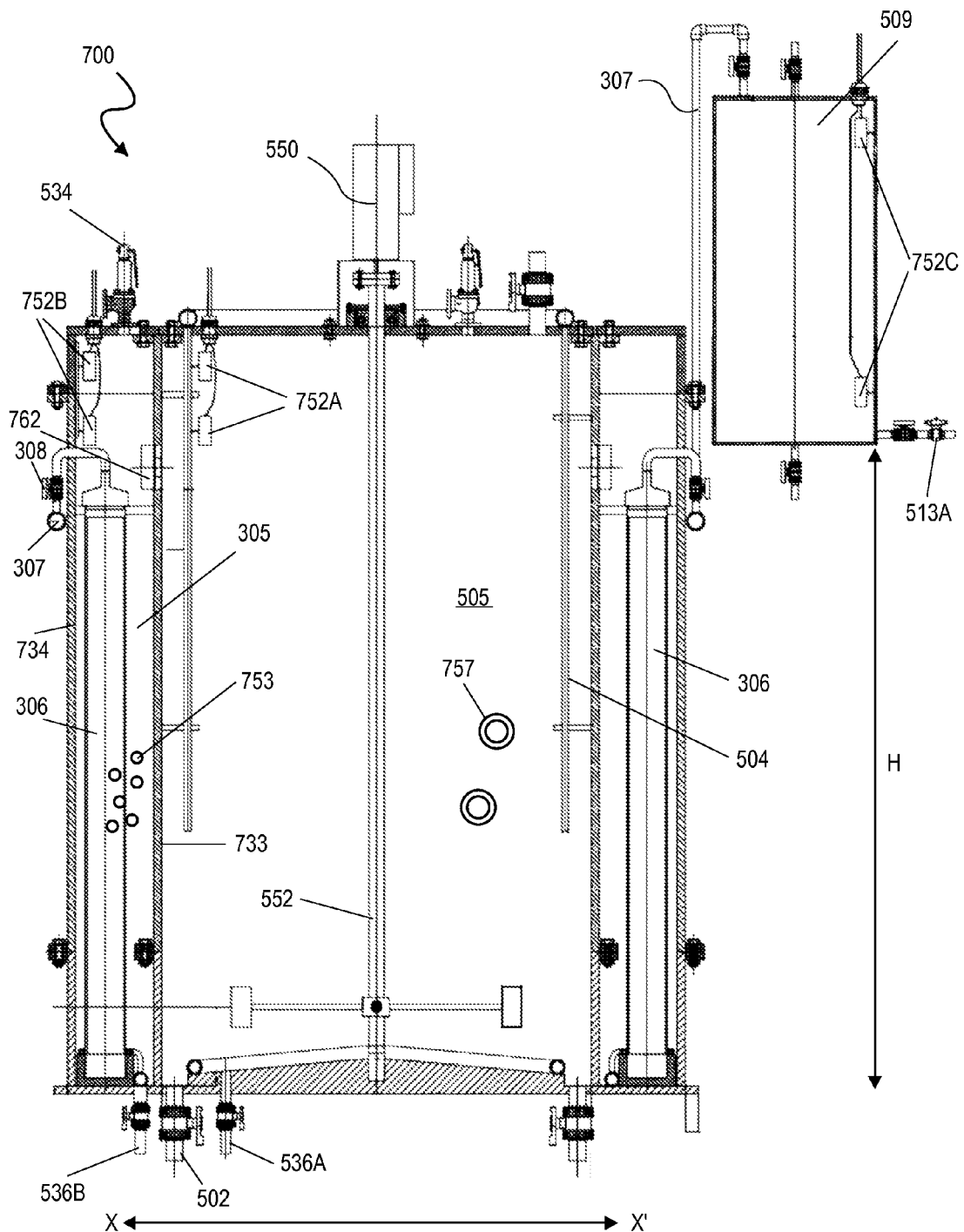
FIG. 7A illustrates a cross-sectional side view of a water treatment and membrane filtration apparatus which may be utilized in the water treatment system illustrated in the FIG. 5, in accordance with embodiments of the present invention.
Figure 7B:
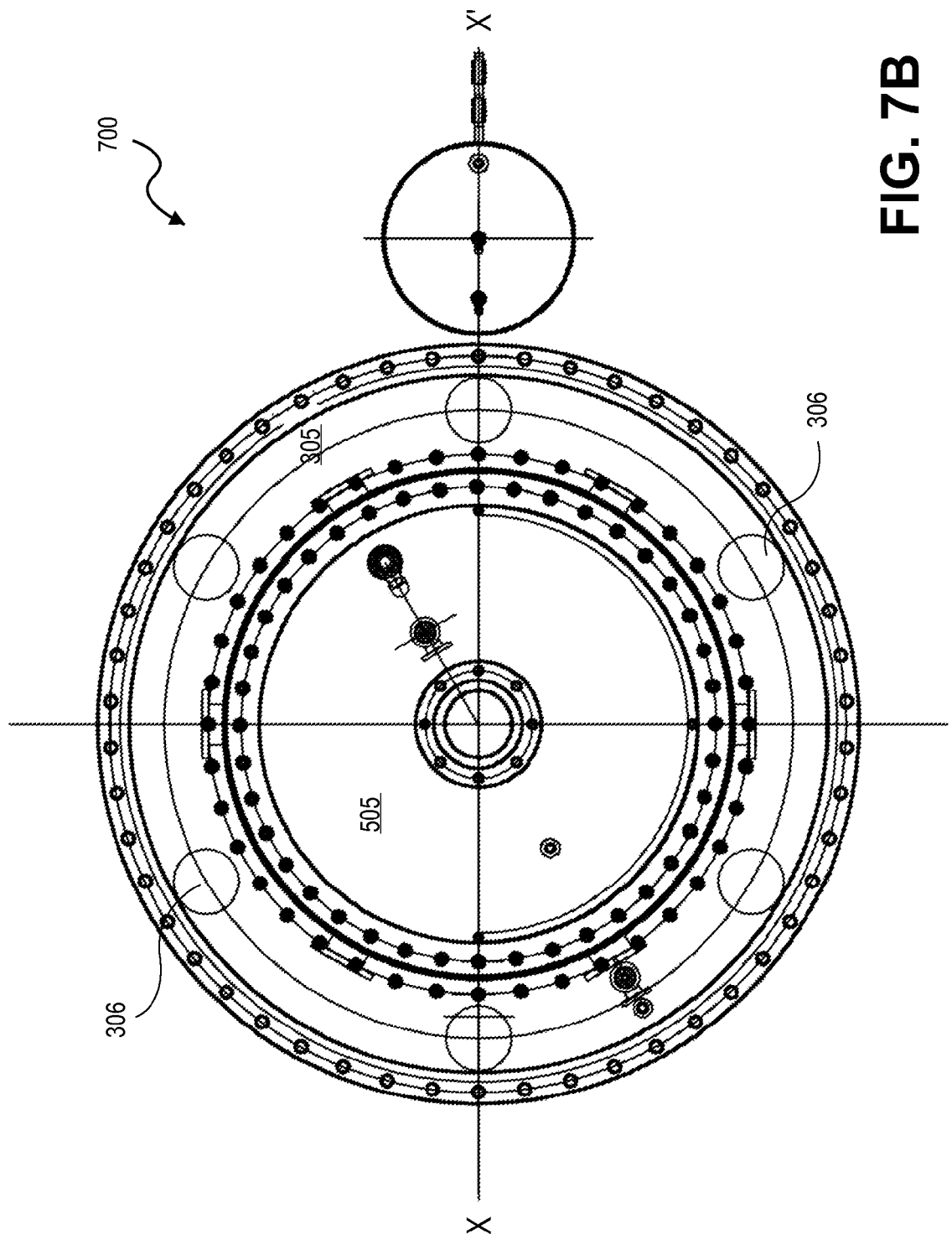
FIG. 7B illustrates a plan view of the water treatment and membrane filtration apparatus illustrated in FIG. 7A, in accordance with embodiments of the present invention.

FIG. 7A illustrates a cross-sectional side view of an exemplary water treatment and membrane filtration apparatus 700 which may be utilized in the water treatment system illustrated in the FIG. 5, in accordance with embodiments of the present invention. FIG. 7B illustrates a plan view of the water treatment and membrane filtration apparatus 700.

In FIG. 7A, the reactor 505 is defined by an inner chamber wall 733 with lines disposed therein for receiving the separator effluent stream 504 and a drain line, for example to the municipal sewer 502. The exemplary reactor 505 is sized to provide a hydraulic retention time (HRT) of between 2 and 4 hr. The hydraulic mixer 550 is disposed on a top of the apparatus 700 with the mixing shaft 552 attached thereto. The filtration vessel 305 defined as an annular space between the inner chamber wall 733 and an outer chamber wall 734 and sized to provide an exemplary HRT 0.5-1 hr. As show in FIG. 7B, a plurality of the membrane filter 306 are equally spaced within the annularly shaped filtration vessel.

As shown in FIG. 7A, the reactor 505 includes carrier media 757 disposed therein while the filtration vessel 305 includes scouring elements 753. Coupled to an effluent side of the membrane filter 306 are lines for conducting the filtered effluent stream 307 to the RO feed tank 509 further having line out for the filtered effluent stream 511.

Air inlets 536A and 536B couple air from the hydraulic compressor 540 (FIG. 5) into the reactor 505 and filtration vessel 305, respectively. As further illustrated in FIGS. 7A and 7B, a backflow prevention mechanism 762 (e.g., a plurality of check valves embedded in the inner wall 733) separates the reactor 505 from the filtration vessel 305 to prevent backflow of the treated effluent 507 when a pressure control device 534 (e.g., an automated air vent) causes the filtration vessel 305 to be pressurized above that of the reactor 505 via the air inlet 536B.

Figure 8:
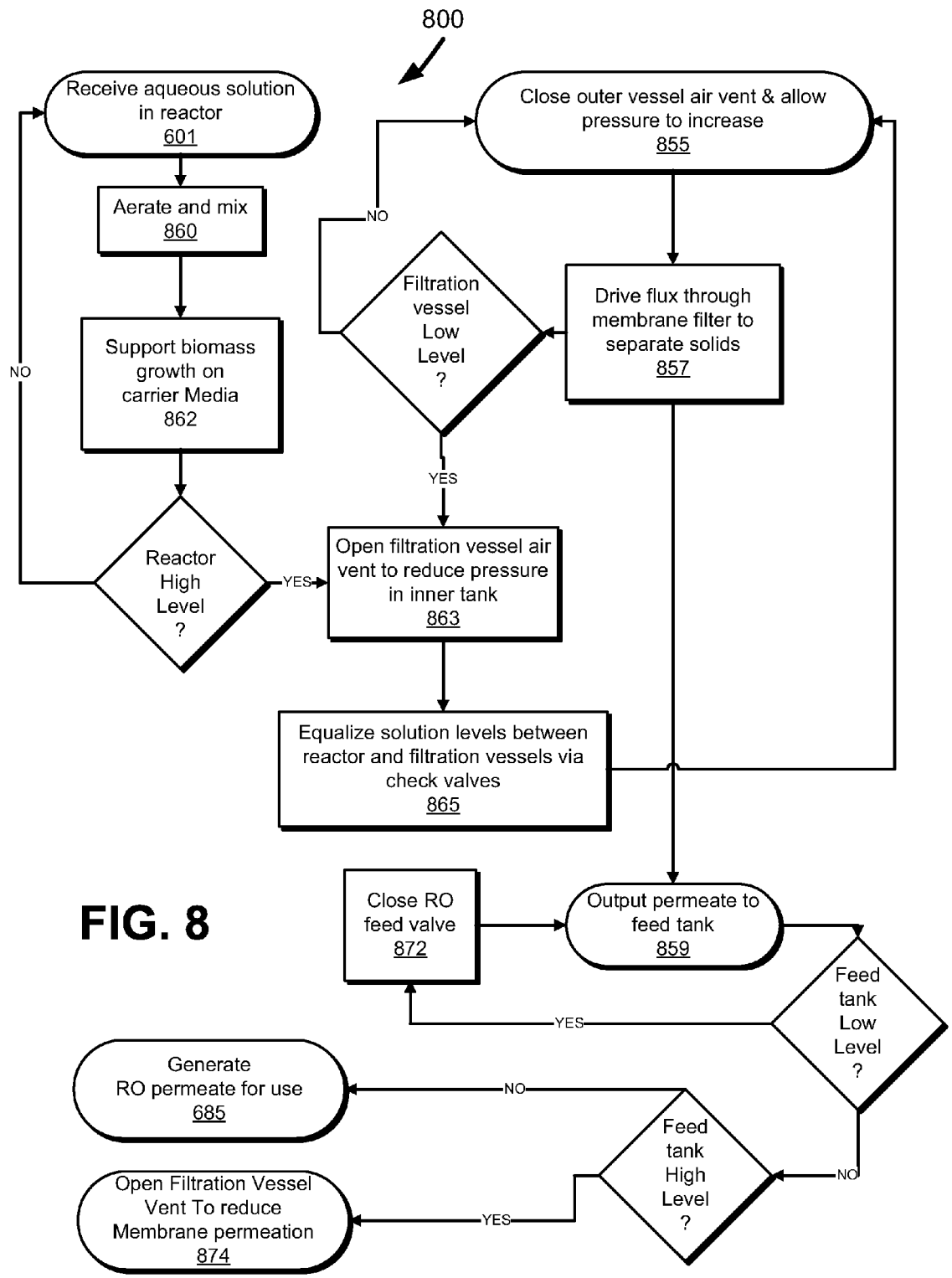
FIG. 8 illustrates a water treatment method which may be performed by the water treatment and membrane filtration apparatus illustrated in FIGS. 7A, 7B to implement the treatment and filtration operations illustrated in FIG. 6, in accordance with an embodiment of the present invention.

FIG. 8 is a flow diagram illustrating a water treatment method 800 which may be performed by the water treatment and membrane filtration apparatus 700. The method 800 should therefore be considered an exemplary sequence of operations implementing an advantageous mode of the treatment and filtration operations generally described in reference to FIGS. 5 and 6.

Method 800 begins with operation 601 where, as previously described, aqueous solution for treatment is received by the reactor 505 (inner vessel). The reactor 505 operates between low and high level sensors 752A, for example corresponding to approximately 15% of the reactor volume. At operation 860 the reactor 505 is continuously mixed, for example via the hydraulic mixer 550, and aerated, for example via the hydraulic air compressor 540. At operation 862, biomass is grown on the surface of the plastic carriers 757 as well as freely suspended in the reactor.

If the reactor 505 reaches the high level, then the pressure control device 534 is actuated (e.g., opened) at operation 863 to equilibrate the pressure between the reactor 505 and filtration vessel 305, allowing for solution levels between the reactor 505 and filtration vessel 305 to equilibrate at operation 865 via the backflow prevention mechanism 762. Screening retains biomass carriers 757 in the reactor 505. Upon equalization of solution levels, method 800 returns to operation 266 where the pressure control device 534 actuates (e.g., closes) to allow pressure in the filtration vessel 305 to increase via air introduced through air inlet 636B. The increased pressure drives flux across the (microfiltration) membrane filter 306 at operation 857. The level in the filtration vessel decreases due to permeation through the membrane filter 306 with the filtered effluent stream 307 being output to the RO feed tank 509 at operation 859. While the pressure control device 534 operates to elevate the filtration vessel pressure, the level in the reactor 505 will continue to increase due to influent stream 101.

Upon the filtration vessel 305 reaching a low level located at the top of the membrane filter 306, level sensors 752B actuate the pressure control device 534 to reduce pressure to ambient. Solution flux through the membranes(s) 306 is thereby reduced to avoid drying out the membranes or forming a biomass cake. During all or a portion of the time while at the low level, permeate flux may be zero and utilized for the membrane back-pulse described elsewhere herein (i.e., flux reversed).

The RO feed tank 509 also operates between low and high level sensors 752C. The tank is elevated by height H relative to the filtration vessel 305 to provide sufficient minimum head to the hydraulic pump 120. When level in the RO feed tank 509 reaches the low level (e.g., insufficient MBR product), an RO feed valve downstream of the RO feed tank 509 (FIG. 5) and downstream of the RO bypass, 513A and 513B, respectively, close at operation 872. RO bypass return 521 recirculates the RO bypass stream 512 after driving the hydraulic air compressor 540 back to the filtered effluent (permeate) stream 511, downstream the RO feed valve 513A. Upon the level reaching the high level sensor (e.g., permeate flow from filtration vessel 305 exceeds capacity of the RO unit 110), the pressure control device 534 is actuated at operation 874 to reduce filtration vessel pressure and thereby interrupt permeate flow. When the RO feed tank level is between the level sensors, the RO feed valves 513A and 513B are open, allowing permeation (generating final quality permeate stream 595) at operation 685.

As the hydraulic pump 120 drives permeation through the RO unit 110 and also supplies hydraulic power to drive the aeration, mixing, and pressurization of the filtration vessel, as well as other maintenance operations, when the RO feed is interrupted, the hydraulic pump 120 continues to recirculate RO feed quality water through the RO bypass stream 512 and back to an inlet of the hydraulic pump 120 (through the return 521). The pressure at the pump inlet is adjusted to be equal to the low level head of the RO feed tank, allowing both streams to feed the pump simultaneously when filtered effluent (permeate) stream 511 is available.

A number of service flows may also be performed either simultaneously or cyclically with the method 800. For example, the electrolytic cell 365 generates a low-level of oxidizing species (e.g., chlorine) from the RO concentrate stream 514, as described elsewhere herein. In the exemplary embodiment, the electrolytic cell 365 operates continuously with the retention time (and as a result the chlorine concentration) controlled by timer. Injection of the oxidizing species (biocide) may be triggered upon activating the RO feed valve. Also during the method 800, the back-pulse as described elsewhere herein is injected into the membrane regularly when the pressure control device 534 is actuated to reduce filtration vessel pressure. The duration of the back-pulse may be controlled by timer or pressure regulated. During method 800, excess sludge from the reactor 505 will overflow to the filtration vessel 305. Periodically (e.g., once a day) aeration of the reactor 505 is halted, and after short settling of the scouring elements 753, the content of the reactor will be drained, for example from the upper portion of the filtration vessel 305 and discharged into municipal sewer 502. Other system rinses may also be performed periodically. For example, the pressurized RO concentrate stream 514 may be used for the rinses in the solids separator 503, discharging into the municipal sewer 502. Similarly, rinses downstream of the filtration vessel 305 may use pressurized recirculation flow via the RO bypass stream 512.

Uninterrupted processing of the influent stream 101 occurs when the treatment system 500 operates normally. However, one or more of a number interlocks may be triggered in response to a system malfunction. For example, in the absence of the influent stream 101, the level in both the reactor 505 and filtration vessel 305 will reach the respective low levels with aeration continued to maintain biomass activity. Interruption of a sufficient duration will lead to interruption of the RO unit 110. An absence of the RO concentrate stream 514 will halt the hydraulic mixer 550. In this case, mixing is provided by aeration only. In the event of a toxic feed, pH meter 583 will register a change in the reactor 505 and/or filtration vessel 305, generating an alarm and/or operator response. In the event of a surge in the influent stream 101, the high level in the reactor 505 is exceeded and a bypass valve diverts the separator effluent stream 504 to the municipal sewer 502. In the event the filtration vessel 305 becomes clogged, hydraulic pump 120 stops, or a membrane in the RO unit 110 becomes clogged, both the filtration vessel 305 and reactor 505 reach the high level, and the bypass valve to the municipal sewer 502 is activated triggering an alarm for operator response. In the event the electrolytic cell 365 fails, membranes in the RO unit 110 will become clogged, again triggering the high levels in both the filtration vessel 305 and reactor 505 resulting in an alarm.

Figure 9:
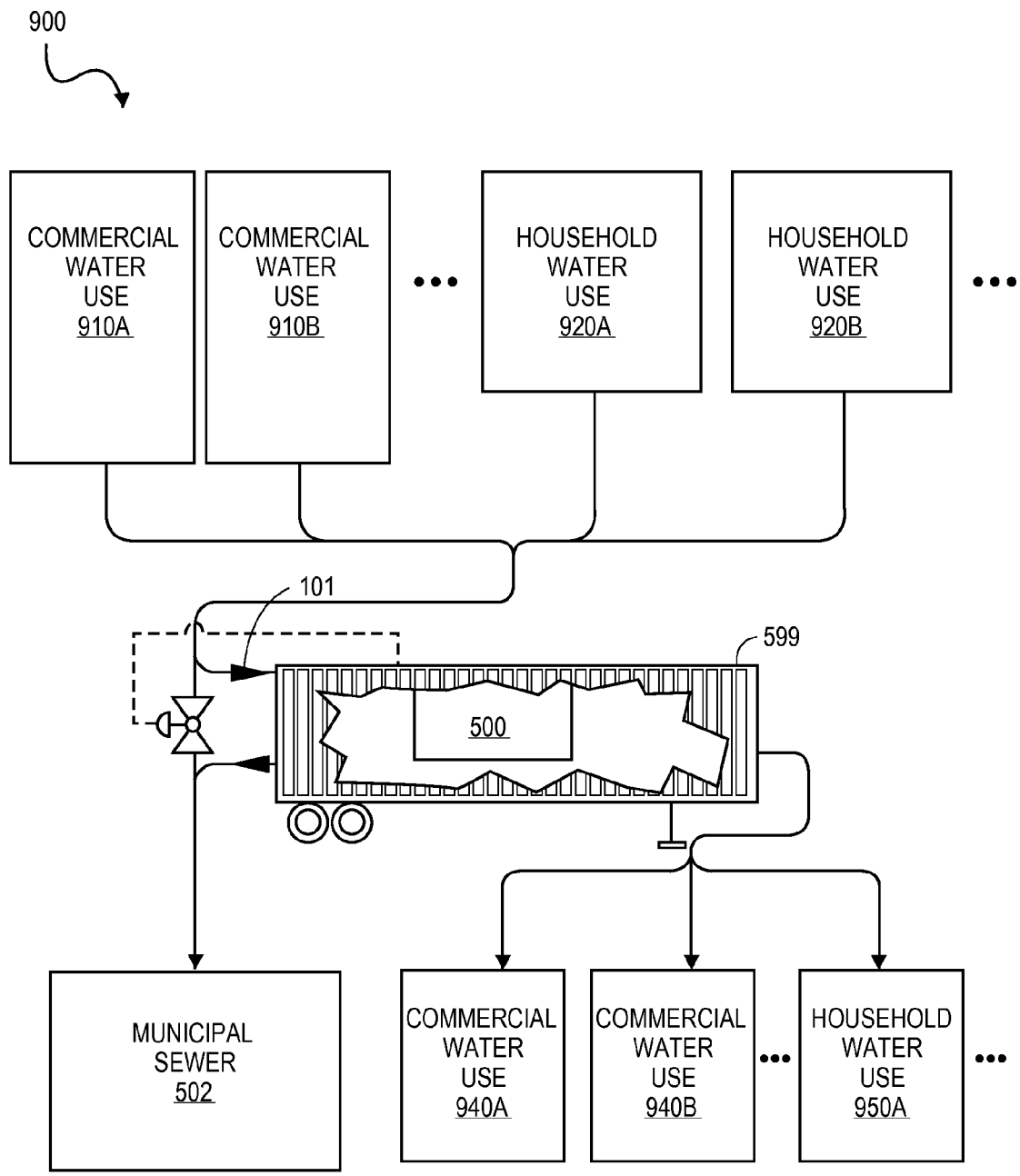
FIG. 9 is a water treatment system architecture in which the integrated water treatment system illustrated in FIG. 5 may be implemented within an existing sewer or industrial treatment system, in accordance with an embodiment of the present invention.

FIG. 9 is a water treatment system architecture 900 in which the integrated water treatment system 500 may be implemented within an existing POTW, in accordance with an embodiment of the present invention. As shown, the water treatment system 500 receives the influent stream 101 from one or more upstream commercial water uses 910A, 910B and/or household water uses 920A, 920B and returns a processed effluent for one or more downstream commercial water uses 940A, 940B or household water uses 950A. The downstream uses may be the same as the upstream uses (e.g., a car wash) or may be downgraded (e.g., laundry upstream, car wash downstream, etc.). In the illustrative embodiment, the treatment system 500 is scaled to be completely contained within a conventional tractor trailer/shipping container 599. As such, the treatment system 500 is capable of mobile, distributed point of use treatment which can reduce loading on the primary municipal treatment facilities and differential water qualities based on use. At this exemplary scale, it is expected that the treatment system 500 can accommodate an average influent stream volumetric flow rate of up to 10,000 gal per day, depending on the quality of the influent stream 101. With the treatment system 500 being a distributed treatment resource inserted into a municipal treatment framework proximate the point of use, connection to the municipal sewer 502 provides a failsafe as well as a means to dispose of separated solids, etc. in a more concentrated form.

The above description of illustrative embodiments of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The scope of the invention is therefore to be determined entirely by the following claims, which are to be construed in accordance with established doctrines of claim interpretation.

What is claimed is:

1. A water treatment system, comprising:
a vessel for at least one of filtration or biological, chemical, or physical-chemical treatment of an aqueous solution;
a hydraulic pump disposed downstream of the vessel to drive a vessel effluent and to create a fluid pressurized by the hydraulic pump; and
a hydraulically driven motor having a drive side in fluid communication with the fluid pressurized by the hydraulic pump, and a driven side coupled to one of a mechanical mixer or a compressor, wherein the hydraulically driven motor is driven by the fluid pressurized by the hydraulic pump to power the compressor or mechanical mixer to perform mixing, aerating, or pressurizing of the aqueous solution in the vessel for filtration or treatment of the aqueous solution in the vessel, and wherein the hydraulically driven motor does not power the hydraulic pump.

2. The water treatment system of claim 1, further comprising a reverse osmosis (RO) unit downstream of the vessel to receive effluent from the vessel and downstream of the hydraulic pump, wherein the pump is to drive the vessel effluent into an influent side of the RO unit.

3. The water treatment system of claim 2, wherein the hydraulically driven motor has the driven side coupled to an air compressor having an air outlet coupled into the vessel to introduce air into the vessel, and wherein the motor drive side is in fluid communication with an RO bypass disposed downstream of the hydraulic pump and upstream of the RO unit, or with a concentrate outlet of the RO unit.

4. The water treatment system of claim 3, wherein the vessel further comprises a membrane filter and a pressure control device to intermittently cause the vessel to become pressurized above ambient conditions by the air introduced into the vessel.

5. The water treatment system of claim 3, wherein the vessel further comprises a membrane filter and a plurality of scouring elements disposed within the vessel, the scouring elements displaceable by the air introduced into the vessel to mechanically scour an influent side of the filter.

6. The water treatment system of claim 2, wherein the vessel is a filtration vessel, wherein the hydraulically driven motor has the driven side coupled to an air compressor having an air outlet coupled into the filtration vessel to introduce air into the filtration vessel, and wherein the motor drive side is in fluid communication with an RO bypass disposed downstream of the hydraulic pump and upstream of the RO unit.

7. The water treatment system of claim 2, wherein the hydraulically driven motor has the driven side coupled to a mechanical mixer disposed within the vessel and wherein the motor drive side is in fluid communication with a concentrate outlet of the RO unit or with an RO bypass disposed downstream of the hydraulic pump and upstream of the RO unit.

8. The water treatment system of claim 7, wherein the vessel is a treatment vessel and the system further comprises a filtration vessel downstream of the treatment vessel to receive a treated effluent, wherein the system further comprises a second hydraulically driven motor with a driven side coupled to an air compressor having an air outlet coupled into the filtration vessel to introduce air into the filtration vessel, and wherein a drive side of the second hydraulically driven motor is in fluid communication with an RO bypass disposed downstream of the hydraulic pump and upstream of the RO unit.

9. A water treatment system, comprising:
a filtration vessel having a filter for filtration of an aqueous solution;
a hydraulic pump disposed downstream of the filtration vessel to drive a filtration vessel effluent and to create a fluid pressurized by the hydraulic pump; and
a hydraulically driven motor having a drive side in fluid communication with the fluid pressurized by the hydraulic pump, and a driven side for pressurizing the filtration vessel, wherein the hydraulically driven motor is driven by the fluid pressurized by the hydraulic pump to power the pressurizing of the filtration vessel for filtration of the aqueous solution in the filtration vessel, and wherein the hydraulically driven motor does not power the hydraulic pump.

10. The water treatment system of claim 9, further comprising a reverse osmosis (RO) unit downstream of the vessel to receive effluent from the vessel and downstream of the hydraulic pump, wherein the pump is to drive the vessel effluent into an influent side of the RO unit.

11. The water treatment system of claim 10, wherein the hydraulically driven motor has the driven side coupled to an air compressor having an air outlet coupled into the vessel to introduce air into the vessel, and wherein the motor drive side is in fluid communication with an RO bypass disposed downstream of the hydraulic pump and upstream of the RO unit or with a concentrate outlet of the RO unit.

12. The water treatment system of claim 11, wherein the filter comprises a membrane filter and a pressure control device to intermittently cause the filtration vessel to become pressurized above ambient conditions by the air introduced into the filtration vessel.

13. The water treatment system of claim 11, wherein the filter comprises a membrane filter and a plurality of scouring elements disposed within the filtration vessel, the scouring elements displaceable by the air introduced into the filtration vessel to mechanically scour an influent side of the filter.

14. The water treatment system of claim 10, wherein the hydraulically driven motor has the driven side coupled to an air compressor having an air outlet coupled into the filtration vessel to introduce air into the filtration vessel, and wherein the motor drive side is in fluid communication with an RO bypass disposed downstream of the hydraulic pump and upstream of the RO unit.

15. The water treatment system of claim 10 further comprises a reactor vessel upstream of the filtration vessel and a second hydraulically driven motor having a driven side coupled to a mechanical mixer disposed within the reactor vessel and wherein the motor drive side is in fluid communication with a concentrate outlet of the RO unit or with an RO bypass disposed downstream of the hydraulic pump and upstream of the RO unit.

\* \* \* \* \*